United States Patent
Daniels

[15] 3,679,729

[45] July 25, 1972

[54] CONTINUOUS PROCESS FOR PREPARING METHYLENE-BISIMINODIACETONITRILE

[72] Inventor: David A. Daniels, Kendall Park, N.J.
[73] Assignee: W. R. Grace & Co., New York, N.Y.
[22] Filed: Aug. 13, 1968
[21] Appl. No.: 752,375

[52] U.S. Cl.............................260/465.5, 260/465, 260/519
[51] Int. Cl.......................................................C07c 121/42
[58] Field of Search...............260/465.5 H, 365.5 A, 465.5 F

[56] References Cited

FOREIGN PATENTS OR APPLICATIONS 974,787  11/1964  Great Britain......................260/465.5
1,159,959  12/1963  Germany..........................260/465.5

Primary Examiner—Joseph P. Brust
Attorney—Charles L. Harness and Kenneth E. Prince

[57] ABSTRACT

This invention is directed to a fully continuous process for preparing methylenebisiminodiacetonitrile comprising continuously reacting an aqueous acidic reaction mixture consisting essentially of an ammonia source selected from the group consisting of hexamethylenetetramine and ammonium sulfate, formaldehyde, and HCN to form methylenebisiminodiacetonitrile; continuously separating, continuously drying, and continuously recovering the methylenebisiminodiacetonitrile, all as recited hereinafter.

14 Claims, 3 Drawing Figures

PATENTED JUL 25 1972

INVENTOR
David A. Daniels

Kenneth E. Prince Atty

INVENTOR
David A. Daniels

CONTINUOUS PROCESS FOR PREPARING METHYLENEBISIMINODIACETONITRILE

BACKGROUND OF THE INVENTION

This invention is in the field of methylenebisiminodiacetonitrile (MBIDAN) preparation.

Prior art methods for preparing MBIDAN are reviewed in British Pat. No. 974,787.

The process of the instant invention, unlike the processes of the prior art is a fully continuous process yielding MBIDAN having a purity of at least 98–99.9 percent and a melting point of 84–86°C.

In summary, this invention is directed to a fully continuous process for preparing MBIDAN comprising:

a. charging into a cooled agitated mixing zone, and mixing therein to form an aqueous reaction mixture, reactants consisting essentially of; (i) an ammonia source selected from the group consisting of ammonium sulfate and hexamethylenetetramine (HMTA), the HMTA being both an ammonia source and a formaldehyde source; (ii) an aqueous formaldehyde solution; (iii) a strong mineral acid; and (iv) liquid anhydrous HCN while maintaining the temperature of the reactants in the mixing zone within the range of about 10°–40°C., the mole ratio of ammonia:formaldehyde:HCN in the aqueous reaction mixture being about 1:2.5–3:2–3, the weight ratio of ammonia to water in the aqueous reaction mixture being about 1:2–20; and the pH of the aqueous reaction mixture being about 1–3;

b. passing the aqueous reaction mixture through a heated reaction zone, residence time in the reaction zone being about 0.1–30 minutes, while maintaining the temperature of the aqueous mixture in the reaction zone within the range of about 20°–90°C. to form a reacted mixture consisting essentially of methylenebisiminodiacetonitrile and an acidic aqueous liquor (The reacted mixture contains MBIDAN which formed when the reaction mixture reacted to form said reacted mixture, the reaction being represented by the equation:

$$2NH_3 + 5HCHO + 4HCN$$

(MBIDAN)

Part or all of the MBIDAN may be dissolved in the acidic aqueous liquor present in the reacted mixture depending upon the concentration of the MBIDAN present in the reacted mixture and the temperature of the reacted mixture. Under the conditions prevailing in the process of the instant invention some MBIDAN will be present in the solid phase (i.e., present as precipitated crude MBIDAN) when the temperature of the reacted mixture is about 50°C. or lower. In other words if, in the process of this invention, the temperature of the reacted mixture is below about 50°C. said mixture will be a slurry consisting essentially of crude precipitated MBIDAN and an acidic mother liquor. Above about 50° C. it is, under some conditions within the scope of this invention, entirely possible for all of the MBIDAN to be present in the reacted mixture as dissolved MBIDAN. It is obvious that when the temperature of the reacted mixture is above the melting point of the crude MBIDAN present therein no solid MBIDAN will be present in said mixture.)

c. adjusting the temperature of the reacted mixture to about 5°–50C. if it is not already within this temperature range to form crude precipitated crystalline MBIDAN and an acidic mother liquor;

d. passing the crude precipitated crystalline MBIDAN and the mother liquor through a separating zone to separate the crude crystalline MBIDAN from the mother liquor; and e. recovering the separated MBIDAN.

IN THE DRAWINGS

The drawings are a flowsheet showing preferred embodiments of the instant invention.

Figure 1:
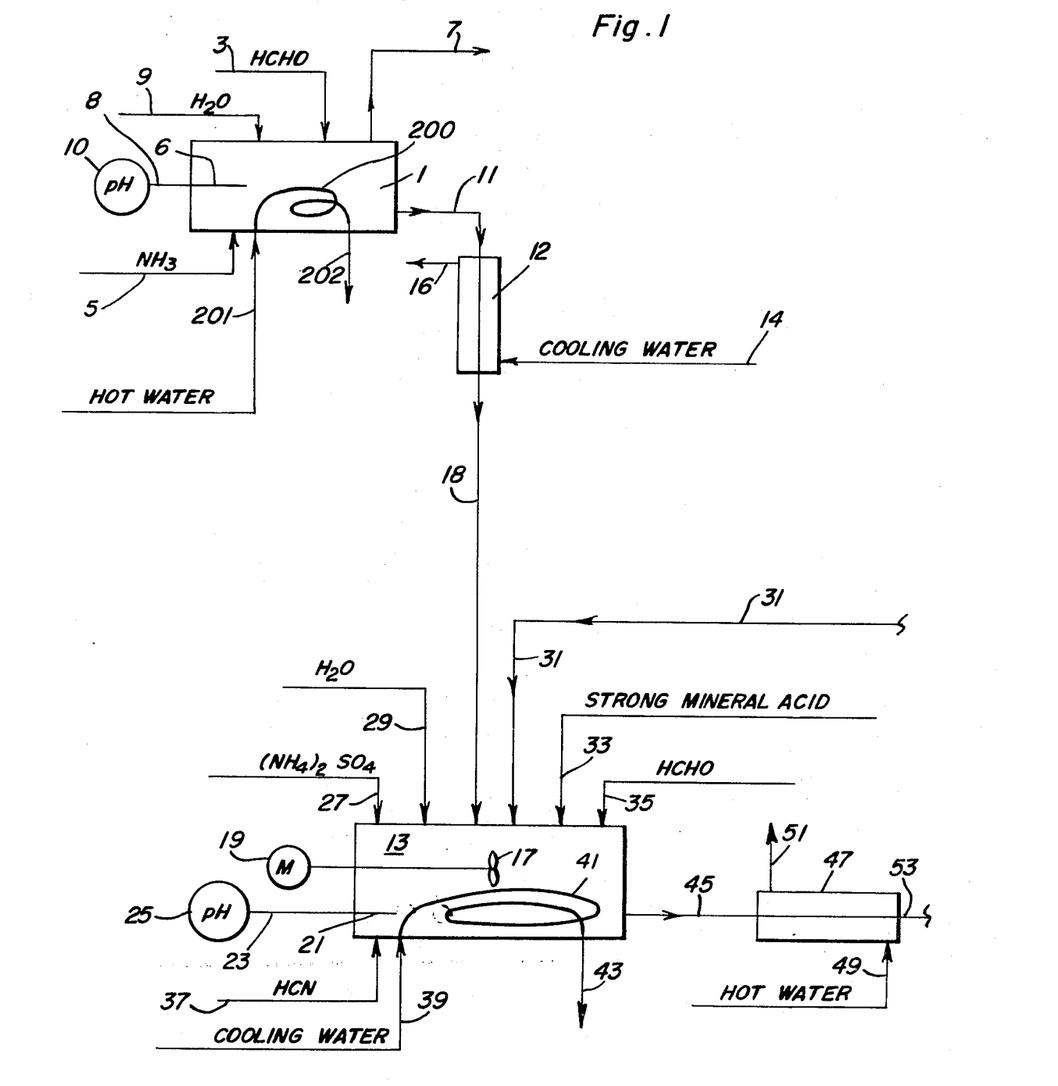
Figure 2:
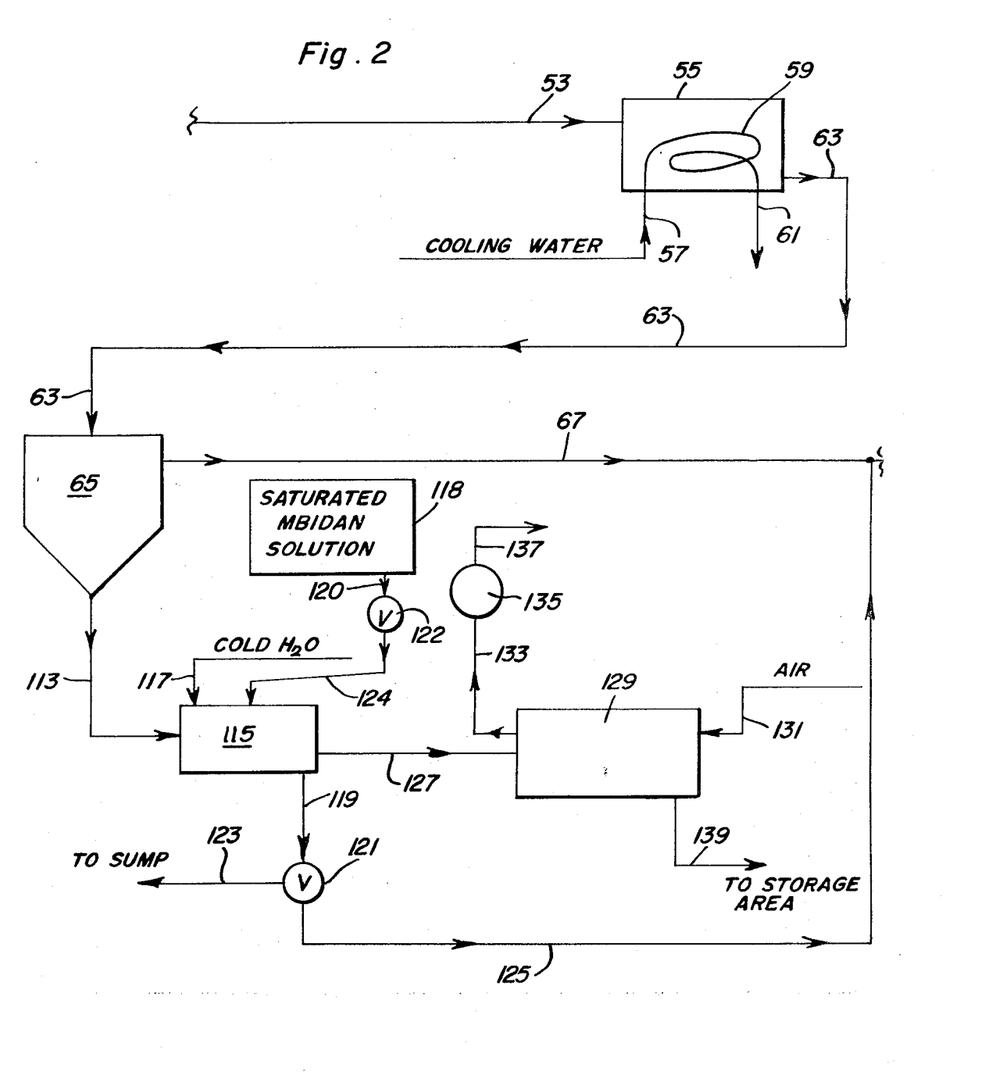
Figure 3:
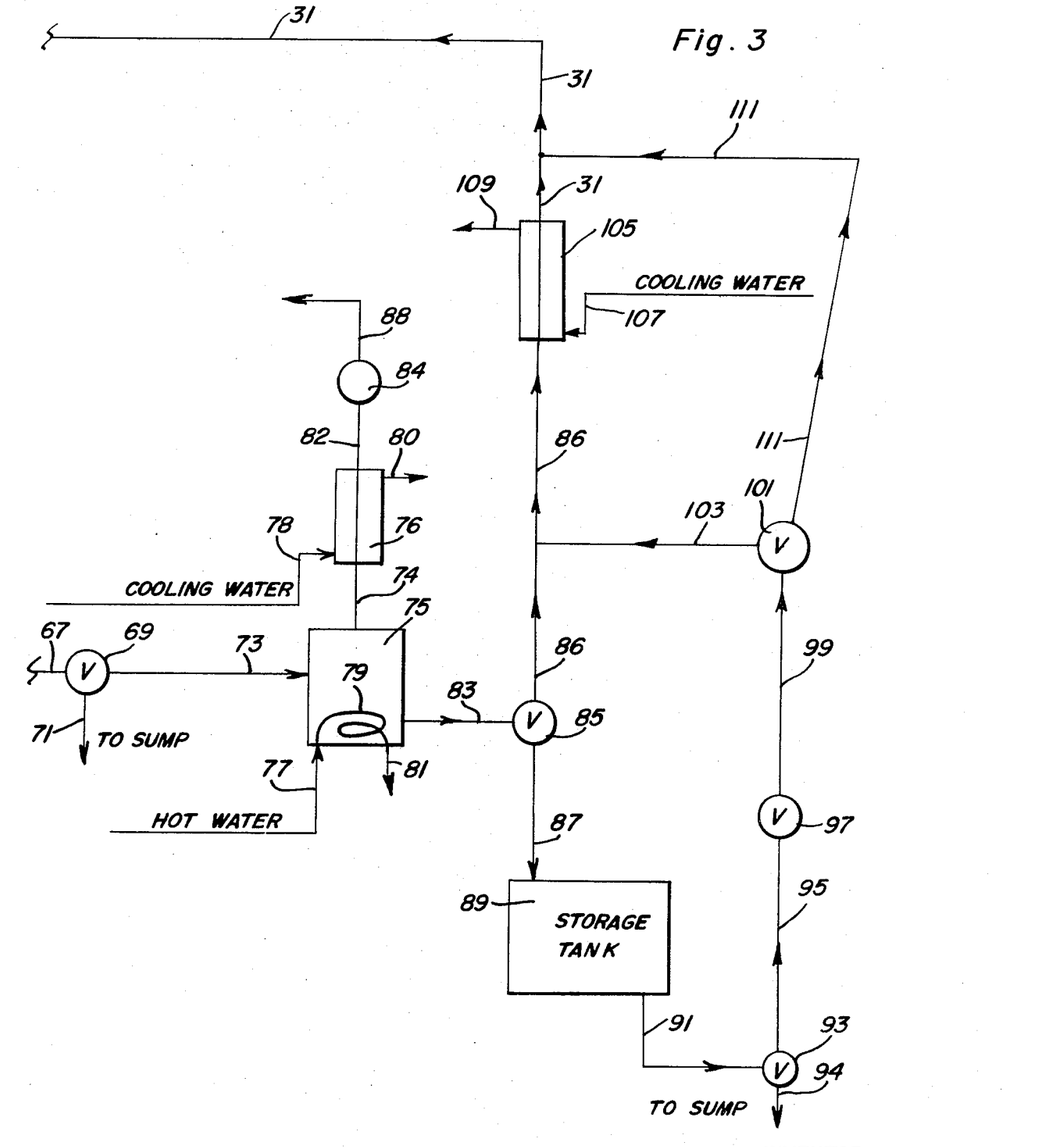

In preferred embodiments of the process set forth in the above summary:

1. The separated crude crystalline MBIDAN is washed in a washing zone until the crystalline methylenebisiminodiacetonitrile is substantially free of mother liquor (If desired the crystalline MBIDAN can be dried in a drying zone at about 30°–60°C. at about 5–760 millimeters of mercury absolute pressure until the crude crystalline MBIDAN is substantially free of moisture before recovering the MBIDAN, the thus dried MBIDAN having a purity of about 98–99.9 percent and a melting point of about 84°–86°C.

2. The aqueous formaldehyde solution analyzes about 20–50 percent HCHO;

3. The ammonia source is an aqueous HMTA solution analyzing about 25–55 percent HMTA:

4. The strong mineral acid is sulfuric acid; and

5. The residence time in the reaction zone is about 0.3–15 minutes.

In another embodiment (Embodiment A), this invention is directed to a fully continuous process for preparing MBIDAN comprising:

a. charging into a cooled agitated mixing zone and mixing therein to form an aqueous reaction mixture, reactants consisting essentially of; (i) an aqueous solution of an ammonia source selected from the group consisting of ammonium sulfate and HMTA, the HMTA being both an ammonia source and a formaldehyde source, said aqueous solution analyzing about 45–75 percent water; (ii) an aqueous formaldehyde solution analyzing about 20–50 percent formaldehyde; (iii) a strong mineral acid; (iv) concentrated mother liquor recycled from later recited separating, concentrating, and cooling steps; and (v) liquid anhydrous HCN while maintaining the temperature of the reactants in the mixing zone within the range of about 10°–40°C., the mole ratio of ammonia:formaldehyde:HCN in the aqueous reaction mixture being about 1:2.5–3:2–3, the weight ratio of ammonia to water in the aqueous reaction mixture being about 1:2–20, and the pH of the aqueous reaction mixture being about 1–3;

b. passing the aqueous reaction mixture through a heated reaction zone, residence time in the reaction zone being about 0.1–30 minutes, while maintaining the temperature of the aqueous mixture in the reaction zone within the range of about 20°–90°C. to form a reacted mixture;

c. adjusting the temperature of the reacted mixture to about 5°–50C. if it is not already within this temperature range to form crude precipitated crystalline MBIDAN and a mother liquor;

d. passing the crude precipitated MBIDAN and the mother liquor through a separating zone while maintaining the temperature of the crude MBIDAN and mother liquor in said zone within the range of about 5°–50°C. to separate the crude crystalline MBIDAN from the mother liquor;

e. passing at least a portion of the separated mother liquor into an evaporating and concentrating zone while maintaining the temperature and pressure within said zone at about 50°–95 °C. and 75–630 millimeters absolute pressure, respectively, to evaporate about 20–80 percent of the water present in the mother liquor therefrom to prepare a concentrated mother liquor;

f. passing the concentrated mother liquor through a cooling zone wherein the temperature of the concentrated mother liquor is adjusted to about 10°–30°C.;

g. recycling at least a portion of the cooled concentrated mother liquor to the cooled agitated mixing zone;

h. washing the separated crude crystalline MBIDAN in a washing zone to free the crystalline MBIDAN of mother liquor;

i. drying the washed crystalline MBIDAN in a drying zone at about 30°–60°C. to form substantially dry crystalline MBIDAN; and j. recovering the substantially dry crystalline MBIDAN, the recovered MBIDAN having a purity of about 98–99.9 percent and a melting point of about 84°–86°C.

In especially preferred embodiments of the process described in Embodiment A, supra:

1. The aqueous formaldehyde solution analyzes 30–40 percent HCHO;
2. The ammonia source is an aqueous HMTA solution analyzing about 30–50 percent HMTA;
3. The strong mineral acid is sulfuric acid;
4. The residence time in the reaction zone is about 0.3–15 minutes;
5. The pH of the reaction mixture is about 1.1–2.5;
6. The separated crude crystalline MBIDAN is washed with water, the temperature of the wash water being about 10°–30 °C., the wash water being applied at the rate of about 0.1–2.0 parts per part of crude crystalline MBIDAN;
7. The washed crystalline MBIDAN is dried in the solid state in a stream of air fed into the drying zone at a temperature of about 30°–60°C. and a relative humidity of about 0–30 percent, the pressure within the drying zone being about 5–760 millimeters of mercury absolute; and
8. The separated crude crystalline MBIDAN is washed with a saturated aqueous solution of MBIDAN.

The drawings constitute a flowsheet showing preferred embodiments of the instant invention.

HMTA solution is prepared in first reaction zone 1 by reacting therein a formaldehyde solution which is fed into said reaction zone via line 3 with ammonia which is fed into the reactor via line 5. As the reaction occurs heat is generated causing the production of water vapor which escapes from reaction zone 1 via vent line 7, thereby to increase the concentration of the HMTA solution formed in zone 1. If it is desired to further increase the concentration of such HMTA solution, hot water or steam can be circulated through coils 200 (said hot water or steam enters the coils via line 1 and exits via line 202), thereby to evaporate a further quantity of water from the HMTA solution. Water (or steam) from line 202 can be reheated and recirculated to line 201, or said water (or steam) can be discarded. Alternatively, electric heating coils, a steam (or hot water) jacket, or similar devices can be used to supply heat to concentrate the HMTA solution in zone 1. Ammonia is added to bring the pH within reaction zone 1 to the desired range (9.4–11, preferably 9.5–10.5) pH is determined via pH electrodes 6 which communicate via lines 8 to pH meter 10. The pH meter can be recording type or the type on which the pH is determined by visual observation of a needle dial or the like.

Hot HMTA solution leaves reaction zone 1 via line 11 which feeds into cooling zone 12 wherein the hot HMTA solution is cooled to a temperature within the range of about 10°–30C. by indirect contact with cooling water which enters the jacket of the cooling zone via line 14 and exits therefrom via line 16. The cooling zone can be a heat exchanger with the series of tubes therein or it can be a water jacketed vessel; still other types of heat exchangers excellently adapted for cooling the HMTA solution will be readily apparent to those skilled in the art.

The cooled HMTA solution then passes from cooling zone 12 via line 18 which discharges into cooled agitated mixing zone 13. Alternatively, the aforesaid HMTA solution can be replaced with a solution of ammonium sulfate, said ammonium sulfate solution feeding into cooled agitated mixing zone 13 via line 27. A reaction mixture is formed in the aforesaid agitated mixing zone by adding thereto a formaldehyde solution via line 35, a strong mineral acid (such as sulfuric acid, phosphoric acid, hydrochloric acid, nitric acid, or the like) via line 33. If desired, mother liquor from a later recited separating, concentrating, and cooling step can be recycled to agitated mixing zone 13. Anhydrous hydrogen cyanide is fed into zone 13 via line 37. The materials in zone 13 are mixed via agitator 17 which is driven via driving means (e.g., a motor) 19. The pH of the material within zone 13 is controlled by adjusting the quantity of mineral acid fed into said zone. pH is determined via pH meter 25 which communicates via lines 23 with pH electrodes 21. The pH meter can be recording type or one on which the pH is read by visual observation. (If desired, the pH meter can be used to operate a motor driven valve to control the rate at which mineral acid is added to zone 13.) The temperature of the reaction mixture formed in zone 13 is controlled and kept within the range of about 10°–40°C. via cooling water which is circulated via line 39 to cooling coils 41 and thence from the coils via line 43. Water from line 43 can be sent to the sewer or it can be cooled and recycled via line 39. Alternatively, ice water can be circulated in the cooling coils, or a cooling jacket rather than coils can be used, or, of course, the cooling coils can be wrapped around the outside of zone 13 rather than being placed therein as shown in the flowsheet.

The reacting mixture formed in zone 13 passes therefrom via line 45 to second reaction zone 47, the temperature therein being controlled within the range of about 20°–90°C. (preferably by passing hot water through a heat exchanger in contact with said second reaction zone). Of course other heating means such as the use of electric heating coils, steam, or hot gases will be readily apparent to those skilled in the art. In the system which we prefer to use the reaction zone is tube reactor consisting of at least one tube jacketed with a hot water zone through which hot water enters via line 49 and exits via line 51. Water exit line 51 can be reheated and recycled via line 49 or it can be sent to a sump or hot water sewer. The reacting mixture reacts in reaction zone 47 to form a reacted mixture which contains MBIDAN which, depending on the temperature of the reacted mixture and on the concentration of MBIDAN therein, may be dissolved in the acidic aqueous liquor present in the reaction mixture or part of the MBIDAN may be precipitated. Of course, if the temperature of the reacted mixture is above the melting point of the crude MBIDAN therein, there will be no solid MBIDAN in the reacted mixture until the temperature thereof is cooled.

Reacted mixture passes from reacting zone 47 via line 53 to cooling zone 55 wherein the reacted mixture is cooled to a temperature below about 50°C. (preferably 15°–30°C.). If the temperature of the reacted mixture exit zone 47 is low enough (e.g., ca. below about 50° C., preferably about 15°–30°C.) cooling zone 15 can be dispensed with and line 53 can feed directly into line 63. However, this is generally not the case. Accordingly, line 53 generally feeds into cooling zone 55 rather than into line 63. The reacted mixture is cooled in cooling zone 55 via water circulated from line 57 into cooling coils 59 and thence to line 61 which can discharge into the sewer or, alternatively, water exit line 69 can be cooled and recycled to line 57. While it would be possible to use a cooled heat exchanger in which the reacted mixture circulates in tubes or coils as a cooling zone in the process of this invention, we prefer to use a cooler in which the cooling water is circulated in tubes or coils because a precipitate of MBIDAN which forms in the reacted mixture as said mixture is cooled may tend to plug coils or tubes, particularly if they are small. If desired, agitating means can be included or placed inside of cooling zone 55.

Cooled reacted mixture passes from zone 55 via conveying means 63 (which can be a large line or chute, or the like) to separating means 65 which can be a centrifuge or a rotary filter where the solid crude precipitated MBIDAN is separated from mother liquor.

The acidic mother liquor passes via line 67 to flow dividing valve 69 wherein any part or all of the mother liquor can be sent via line 71 to a sump or any part or all of it can be sent via line 73 to evaporating and concentrating zone 75. Heat can preferably be supplied to zone 75 as hot water which passes via line 77 to coils 73 and then from the system via line 81 which can pass the water to a heating zone from which it is recycled to line 77; alternatively, line 81 can discharge into a sump or hot water sewer. It is important in the process of this invention that the temperature of the material being concentrated in zone 75 be kept below about 90°C. to avoid charring. Accordingly, we prefer to use hot water rather than steam in coils 79. Also we prefer to have the heat source (e.g., hot water or steam) passed through the coils rather than to use tubes in which the mother liquor to be evaporated is contacted with the heat source surrounding the tubes even though such a system would be operable in the process of this invention. Also, electric heating coils could be used to supply the heat or a jacketed vessel could be used with hot water or steam circulated through the jacket.

Vapor passes from zone 75 via line 74 to cooling zone 76 wherein the vapor is condensed by being brought in indirect contact with the cooling source, preferably cold water which enters heat exchanger of cooling zone 76 via line 78 and exits therefrom via line 80. Of course ice water could be used if desired. Condensed vapor from cooling zone 76 passes via line 82 through a vacuum source (for example a vacuum pump) 84 and thence to line 88 which discharges into a sewer or sump. It is necessary to conduct the evaporation in zone 75 under reduced pressure because of the fact that we do not heat the mother liquor therein above about 90°C. for if the mother liquor is heated too hot it will become charred as a consequence of its strong acid content.

Mother liquor which has been concentrated in zone 75 passes therefrom via line 83 to flow dividing valve 85 which can send any part or none or all of the concentrated mother liquor via line 87 to storage tank 89. Flow dividing valve 85 can also pass any portion or all or none of the evaporated liquor from line 83 into line 86. Line 86 passes the evaporated mother liquor into cooling zone 105 where the mother liquor is cooled to a temperature of about 10°-40°(preferably about 20°-30C.). We prefer to use a heat exchanger in which the mother liquor passes through tubes to cool it, however, substantially any kind of cooling heat exchanger can be used with excellent results. In the type of heat exchanger that we prefer to use cooling water (which can be ice water) passes via line 107 into the heat exchanger portion of cooling zone 105 and thence from said zone via line 109 which can discharge the spent cooling water into the sewer or said water can be recooled and recirculated to line 107. If desired, concentrated mother liquor from storage tank 89 can pass via line 91 to flow dividing valve 93. Said valve can be adjusted to pass any portion or all or none of the concentrated mother liquor which enters it to a sump or to a sewer. Said valve can also pass any portion or all or none of the evaporated concentrated mother liquor to line 95 which in turn passes via valve 97 to line 99 and thence to flow dividing valve 101. Valve 101 can be adjusted to pass any portion or all or none of the mother liquor which enters it into line 103. Alternatively, the valve can pass any portion or all or none of such mother liquor into line 111. If the temperature of the mother liquor exit tank 89 is above about 40°-50°, said mother liquor is sent to line 103 which in turn feeds into line 86 and thence into the aforesaid cooling zone 105. However, if the mother liquor exit the storage tank is below about 30°-40°C. valve 101 is set so that the concentrated mother liquor passes to line 111 and thence into line 31 (bypassing cooling zone 105); line 31 feeds the mother liquor into cooled agitated mixing zone 13.

Crude precipitated MBIDAN separated in separating zone 65 passes via conveying means 113 (which can be a large line, a chute, or the like) passes to washing zone 115 where it is washed either with cold water (e.g., water at about 5°-30°C.) or a saturated solution of MBIDAN. If separating zone 65 is a rotary filter, it is obvious that the same filter can be used as the washing zone, thereby to alleviate the need for a separate washing zone because the filtered cake (crude MBIDAN) on the surface of the rotary filter can be washed as the filter rotates, thereby to alleviate the need for a separate washing zone. However, the washing zone can be separate for example, a Dorr thickner type of washing zone. Other types of continuous washing devices are well known and their use for this purpose will be readily apparent to those skilled in the art. Cold water can be fed into the washing zone via line 117. Alternatively, a saturated solution (or a substantially saturated solution) of MBIDAN can be passed from storage zone 118 via line 120 and valve 122 to line 124 which feeds into washing zone 115. The spent washing solution passes from washing zone 115 via line 119 and flow dividing valve 121. Said valve can pass any portion or all or none of the used washing solution to a sump via line 123. Alternatively, this valve can pass all or any portion thereof or none of the spent washing solution to line 125 and thence to line 67.

The washed MBIDAN passes via conveyor means 127 which can be a chute, a screw conveyor, an elevator, or the like to drying zone 129 where the wet washed MBIDAN is substantially dried in a stream of air which enters drying zone 129 via line 131. Air used for this purpose has an inlet temperature of about 30°-60°C. and a relative humidity of about 10-70 percent—preferably below about 50 percent. Air passes from drying zone 129 via line 133 and suction source 135. Air passes from suction source 135 to line 137 and then to the atmosphere. Suction source 135 can be a fan which simply draws air through the drying zone or it can preferably be a vacuum source such as a vacuum pump, or steam jet or water jet, or air jet, or the like. Pressure within the drying zone can vary from about 5-760 millimeters of mercury absolute. Dried MBIDAN passes as a crystalline solid from drying zone 129 to conveyor means 139 which can be a chute, a screw conveyor, an elevator, or the like. The MBIDAN from conveyor means 139 is discharged in a storage area where it is recovered. The recovered MBIDAN can be packaged for example in bags, drums, or the like.

The following examples are set forth by way of illustration and it is understood that the instant invention is not to be construed as being limited by said examples or by the details therein.

EXAMPLE I

A number of runs were made to investigate the preparation of HMTA solution for use in the process of this invention. In each run formaldehyde solution was continuously passed into reaction zone 1. Ammonia was continuously added thereto in a quantity to maintain the pH of the resulting mixture within the range of about 9.4–11 (preferably about 9.5–10.5). The formaldehyde solutions used ranged in strength from about 20 to about 50 percent HCHO with about 25–40 percent being the preferred concentration and about 37 percent being the optimum concentration. The ammonia used was anhydrous ammonia; it was added to the bottom portion of reaction zone 1 via line 5. The resulting HMTA solutions were found to be excellently adapted for use in preparing MBIDAN by the process of this invention. In some instances, where it was desired to increase the concentration of the HMTA for use in the process of this invention the HMTA solution was further concentrated by continuously evaporating water therefrom by continuously applying heat to reaction zone 1. This was preferably done by passing hot water (ca. water) at about 85°–100°C. or at about 90°–95°C. through cooling coil 200. The hot water entered the coil via line 201 and passed from the coil via line 202 the water exit line 202 could be heated and recycled to line 201 or it could be discarded.

EXAMPLE II

A reacting mixture was continuously prepared in cooled agitated reacting zone 13 by continuously adding thereto a 30 percent solution of HMTA in water (via line 18), a 37 percent solution of formaldehyde in water (via line 35), mineral acid (sulfuric acid added via line 33) at a rate to maintain the pH within the zone of about 1.2–1.5, and liquid anhydrous hydrogen cyanide (via line 37) while continuously agitating and cooling the reacting mixture formed in said zone–keeping the temperature of the reacting mixture within the range of about 20°–25°C. The mole ratio of the reactants (NH₃:HCHO:HCN) was 1:2.6:2.3. The thus formed reacting mixture was continuously passed via line 45 to reaction zone 47 wherein the temperature was maintained at about 70°–75 °C. The reacting mixture reacted in reaction zone 47 to form a reacted mixture which contained MBIDAN. The MBIDAN-containing reacted mixture passed via line 53 to cooling zone 59 where the temperature thereof was adjusted to about 25°C., thereby causing the precipitation of crude MBIDAN–the MBIDAN being surrounded by an acidic mother liquor (i.e., the MBIDAN and mother liquor constituted a slurry). The cool slurry passed continuously via line 63 to separating zone 65 a rotary filter where crude precipitated MBIDAN was separated from the mother liquor, the temperature of the slurry being about 25°–30°C. during separation. The mother liquor passed continuously via line 67 to flow dividing 69 and thence via line 71 to a sump. The crude crystalline precipitated crystalline MBIDAN was continuously washed with cold water (water at about 20°C.) the washed water passed via line 119 to flow dividing 121 and thence via line 123 to a sump. The washed MBIDAN crystals passed continuously via line 127 to drier 129 where the MBIDAN was dried in a stream of air having an inlet temperature of about 45°C. and a relative humidity of about 20 percent. The air from the drier passed continuously via line 133 and vacuum providing means 135 to line 137 and thence to the atmosphere. A pressure of about 80–100 millimeters of mercury absolute was maintained in the drying zone. The dried MBIDAN passed continuously from the drying zone via conveyor means 139 to a storage area where the dry MBIDAN was recovered continuously and packaged in bags. The recovered MBIDAN had a purity of about 99–99.5 percent and a melting point of about 84°–86°C.

EXAMPLE III

The general procedure of EXAMPLE II was repeated, except in this instance about 25 percent of the mother liquor was continuously passed from line 67 via dividing valve 69 and line 73 to concentrating and evaporating zone 75 where it (the mother liquor) was concentrated by evaporating therefrom about 50–60 percent of its water content, the evaporated water passing via line 74, condensing means 76, and vacuum producing means 84 to a sewer via line 88. The temperature in the evaporating zone was about 65–68° and the pressure within the zone was adjusted to maintain such temperature. The concentrated mother liquor passed via line 83 flow dividing valve 85 line 86 cooling means 105 and line 31 to cooled agitated mixing zone 13. The recovered MBIDAN had a purity of about 99.3–99.5 percent and a melting point of about 84°–86 °C.

EXAMPLE IV

The general procedure of Example II was repeated; however, in this instance a solution of ammonium sulfate (about 50% (NH₄)₂SO₄) was used in place of the HMTA. In this instance the mole ratio of the reactants (ammonia:formaldehyde:HCN) was about 1:2.5–3:2–3. Results in this instance were substantially identical to those obtained in Example I.

EXAMPLE V

The general procedure of example II was repeated; however, in this instance, the separated MBIDAN was recovered without washing or drying. The recovered crystalline MBIDAN was of excellent quality but it was slightly wet with acidic mother liquor.

MBIDAN prepared according to the process of this invention has been used with excellent results to alkylate phenols. For example, p-cresol (a phenol) has been alkylated with at least one —CH₂N (CH₂CN)₂ group by reacting the phenol with MBIDAN under substantially anhydrous conditions in the presence of a substantially non-oxidizing strong acid to form a salt of the acid and the alkylated phenol (p-cresol) and iminodiacetonitrile (IDAN) according to the reactions represented by the following equation:

The salt was hydrolyzed with sodium hydrogen carbonate solution to form the free alkylated phenol plus the sodium salt of p-toluene sulfonic acid.

The free alkylated phenol was then hydrolyzed by boiling with sodium hydroxide solution, until the evolution of ammonia ceased, to form a sodium salt of the alkylated phenol having the formula:

which was an excellent chelating agent for metalic ions including iron(II) and iron(III) ions. These chelates and iron and trace metal chelates formed from a half acid (said half acid being formed by treating said sodium salt with about 0.5 mole of sulfuric acid per mole of salt) having the formula are excellent additives for adding iron and trace metals to soil—especially to alkaline and calcareous soils—the iron or trace metals being slowly released in the soils.

The salt and the half acid of the alkylated phenol are also excellent materials for removing brown stains caused by iron compounds from sinks, cloth, floors, and the like.

As used herein the term "percent (%)" means parts per hundred by weight unless otherwise defined where used; however, as is well known to those skilled in the art, "percent yield" is a dimensionless number. As used herein the term "parts" means parts by weight unless otherwise defined where used.

As used herein the term "substantially free of moisture" means containing less than about 2 percent moisture.

In all instances washed and dried MBIDAN (i.e., MBIDAN which was washed until substantially free of mother liquor and then dried) prepared by the process of this invention melted at 84°C. or higher—up to 86°C. The usual melting point range was 84°–86°C. As used herein "substantially free of mother liquor" means that the MBIDAN contains less than about 1–2 percent and preferably less than about 0.2 percent mother liquor.

I claim:
1. A fully continuous process for preparing methylenebisiminodiacetonitrile comprising:
   a. charging into a cooled agitated mixing zone, and mixing therein to form an aqueous reaction mixture, reactants consisting essentially of; (i) an ammonia source selected from the group consisting of ammonium sulfate and hexamethylenetetramine, the hexamethylenetetramine being both an ammonia source and a formaldehyde source; (ii) an aqueous formaldehyde solution; (iii) a strong mineral acid; and (iv) liquid anhydrous HCN while maintaining the temperature of the reactants in the mixing zone within the range of about 10°–40°C., the mole ratio of ammonia:formaldehyde:HCN in the aqueous reaction mixture being about 1:2.5–3:2–3, the weight ratio of ammonia to water in the aqueous reaction mixture being about 1:2–20; and the pH of the aqueous reaction mixture being about 1–3;
   b. passing the aqueous reaction mixture through a heated reaction zone, residence time in the reaction zone being about 0.1–30 minutes, while maintaining the temperature of the aqueous mixture in the reaction zone within the range of about 20°–90°C. to form a reacted mixture consisting essentially of methylenebisiminodiacetonitrile and an acidic aqueous liquor;
   c. adjusting the temperature of the reacted mixture to about 5°–50C. if it is not already within this temperature range to form crude precipitated crystalline methylenebisiminodiacetonitrile and an acidic mother liquor;
   d. passing the crude precipitated crystalline methylenebisiminodiacetonitrile and the mother liquor through a separating zone to separate the crude crystalline methylenebisiminodiacetonitrile from the mother liquor; and
   e. recovering the separated methylenebisiminodiacetonitrile.

2. The process of claim 1 in which the separated crude crystalline methylenebisiminodiacetonitrile is washed in a washing zone until the crystalline methylenebisiminodiacetonitrile is substantially free of mother liquor.

3. The process of claim 2 in which the washed crystalline methylenebisiminodiacetonitrile is dried in a drying zone at about 30°–60°C. at about 5–760 millimeters of mercury absolute pressure until the crude crystalline methylenebisiminodiacetonitrile is substantially free of moisture, the thus dried methylenebisiminodiacetonitrile having a purity of about 98–99.9 percent and a melting point of about 84°–86°C.

4. The process of claim 1 in which the aqueous formaldehyde solution analyzes about 20–50 percent HCHO.

5. The process of claim 1 in which the ammonia source is an aqueous hexamethylenetetramine solution analyzing about 25–55 percent hexamethylenetetramine.

6. The process of claim 1 in which the strong mineral acid is sulfuric acid.

7. The process of claim 1 in which the residence time in the reaction zone is about 0.3–15 minutes.

8. A fully continuous process for preparing methylenebisiminodiacetonitrile comprising:
   a. charging into a cooled agitated mixing zone, and mixing therein to form an aqueous reaction mixture, reactants consisting essentially of; (i) an aqueous solution of an ammonia source selected from the group consisting of ammonium sulfate and hexamethylenetetramine, the hexamethylenetetramine being both an ammonia source and a formaldehyde source, said aqueous solution analyzing about 45–75 percent water; (ii) an aqueous formaldehyde solution analyzing about 20–50 percent formaldehyde; (iii) a strong mineral acid; (iv) concentrated mother liquor recycled from later recited separating, concentrating, and cooling steps; and (v) liquid anhydrous HCN while maintaining the temperature of the reactants in the mixing zone within the range of about 10°–40°C., the mole ratio of ammonia:formaldehyde:HCN in the aqueous reaction mixture being about 1:2.5–3:2–3, the weight ratio of ammonia to water in the aqueous reaction mixture being about 1:2–20, and the pH of the aqueous reaction mixture being about 1–3;
   b. passing the aqueous reaction mixture through a heated reaction zone, residence time in the reaction zone being about 0.1–30 minutes, while maintaining the temperature of the aqueous mixture in the reaction zone within the range of about 20°–90°C. to form a reacted mixture;
   c. adjusting the temperature of the reacted mixture to about 5°–50C. if it is not already within this temperature range to form crude precipitated crystalline methylenebisiminodiacetonitrile and a mother liquor;
   d. passing the precipitated crude crystalline methylenebisiminodiacetonitrile and the mother liquor through a separating zone while maintaining the temperature of the crude methylenebisiminodiacetonitrile and mother liquor in said zone within the range of about 5°–50C. to separate the crude crystalline methylenebisiminodiacetonitrile from the mother liquor;
   e. passing at least a portion of the separated mother liquor into an evaporating and concentrating zone while maintaining the temperature and pressure within said zone at about 50°–95°C. and 75–630 millimeters absolute pressure, respectively, to evaporate about 20–80 percent of the water present in the mother liquor therefrom to prepare a concentrated mother liquor;
   f. passing the concentrated mother liquor through a cooling zone wherein the temperature of the concentrated mother liquor is adjusted to about 10°–30°C.;
   g. recycling at least a portion of the cooled concentrated mother liquor to the cooled agitated mixing zone;
   h. washing the separated crude crystalline methylenebisiminodiacetonitrile in a washing zone to free the crystalline methylenebisiminodiacetonitrile of mother liquor;
   i. drying the washed crystalline methylenebisiminodiacetonitrile in a drying zone at about 30°–60C. to form substantially dry crystalline methylenebisiminodiacetonitrile; and
   j. recovering the substantially dry crystalline methylenebisiminodiacetonitrile, the recovered methylenebisiminodiacetonitrile having a purity of about 98–99.9 percent, and a melting point of about 84°–86°C.

9. The process of claim 8 in which the aqueous formaldehyde solution analyzes 30–40 percent HCHO.

10. The process of claim 8 in which the ammonia source is an aqueous hexamethylenetetramine solution analyzing about 30–50 percent hexamethylenetetramine.

11. The process of claim 8 in which the residence time in the reaction zone is about 0.3–15 minutes.

12. The process of claim 8 in which the pH of the reaction mixture is about 1.1–2.5.

13. The process of claim 8 in which the separated crude crystalline methylenebisiminodiacetonitrile is washed with water, the temperature of the wash water being about 10°–30 °C., the wash water being applied at the rate of about 0.1–2.0 parts per part of crude crystalline methylenebisiminodiacetonitrile.

14. The process of claim 8 in which the washed crystalline methylenebisiminodiacetonitrile is dried in the solid state in a stream of air fed into the drying zone at a temperature of about 30°–60°C. and a relative humidity of about 0–30 percent, the pressure within the drying zone being about 5–760 millimeters of mercury absolute.

* * * * *

Notice of Adverse Decision in Interference

In Interference No. 98,878 involving Patent No. 3,679,729, D. A. Daniels, CONTINUOUS PROCESS FOR PREPARING METHYLENEBISIMINODIACETONITRILE, final judgment adverse to the patentee was rendered Nov. 28, 1975, as to claim 5.

[*Official Gazette March 23, 1976.*]